United States Patent [19]
Schmitt et al.

[11] 3,875,937
[45] Apr. 8, 1975

[54] SURGICAL DRESSINGS OF ABSORBABLE POLYMERS

[75] Inventors: Edward Emil Schmitt, Norwalk, Conn.; Rocco Albert Polistina, Port Chester, N.Y.

[73] Assignee: American Cyanamid Company, Stamford, Conn.

[22] Filed: May 31, 1973

[21] Appl. No.: 365,656

Related U.S. Application Data

[63] Continuation-in-part of Ser. No. 157,521, June 28, 1971, Pat. No. 3,739,773, which is a continuation-in-part of Ser. No. 852,617, Aug. 25, 1969, Pat. No. 3,620,218, which is a continuation-in-part of Ser. No. 608,086, Jan. 9, 1967, Pat. No. 3,463,158, which is a continuation-in-part of Ser. No. 320,543, Oct. 31, 1963, Pat. No. 3,297,033.

[52] U.S. Cl............................ 128/156; 128/334 R
[51] Int. Cl. ........................................... A61f 13/00
[58] Field of Search ....... 128/156, 92 BC, 296, 334, 128/335.5; 206/63.3

[56] References Cited
UNITED STATES PATENTS

| | | | |
|---|---|---|---|
| 3,122,479 | 2/1964 | Smith | 128/296 UX |
| 3,297,033 | 1/1967 | Schmitt et al. | 128/335.5 |
| 3,371,069 | 2/1968 | Miyamae et al. | 128/335.5 X |
| 3,419,006 | 12/1968 | King | 128/156 X |
| 3,464,413 | 9/1969 | Goldfarb et al. | 128/156 X |
| 3,636,956 | 1/1972 | Schneider | 128/335.5 |

*Primary Examiner*—Lucie H. Laudenslager
*Attorney, Agent, or Firm*—Samuel Branch Walker

[57] ABSTRACT

Polyhydroxyacetic ester, also called polyglycolic acid (PGA), has surgically useful mechanical properties. On implantation, in living mammalian tissue, the polyglycolic acid is absorbed, and replaced by living tissue. Polyglycolic acid fashioned into a sterile gauze, felt or velour dressing protects a wound surface, such as a burn, traumatic injury, or surgical incision, and may be left at least partially embedded, as in a scab, with the part below the healed tissue surface being absorbed, and that above the tissue surface dropping off with the scab, or be completely embedded therein.

11 Claims, 4 Drawing Figures

ABSORBABLE FABRIC—59

PATENTED APR 8 1975 3,875,937

ABSORBABLE
FABRIC—59

SURGICAL DRESSINGS OF ABSORBABLE POLYMERS

CROSS-REFERENCES

This application is a continuation-in-part of Ser. No. 157,521, filed June 28, 1971, now U.S. Pat. No. 3,739,773, June 19, 1973, which is a continuation-in-part of Ser. No. 852,617, Aug. 25, 1969, now U.S. Pat. No. 3,620,218, Nov. 16, 1971, "Cylindrical Prosthetic Devices of Polyglycolic Acid," which is a continuation-in-part of Ser. No. 608,086, Jan. 9, 1967, now U.S. Pat. No. 3,463,158, Aug. 26, 1969, "Polyglycolic Acid Prosthetic Devices" which is a continuation-in-part of Ser. No. 320,543, filed Oct. 31, 1963, now U.S. Pat. No. 3,297,033, Jan. 10, 1967, "Surgical Sutures." Reference is made to said earlier patents for certain prior art and definitions there set forth.

Related data incorporated herein by this reference on manufacturing of polyglycolic acid, producing surgical elements thereof and its use for surgical purposes, additional prior art and the definitions, are disclosed in:

U.S. Pat. No. 3,414,939 — Dec. 10, 1968, Chirgwin, APPARATUS FOR QUENCHING MELT-SPUN FIBERS.

U.S. Pat. No. 3,422,181 — Jan. 14, 1969, Chirgwin, METHOD FOR HEAT SETTING OF STRETCH ORIENTED POLYGLYCOLIC ACID FILAMENT.

U.S. Pat. No. 3,435,008 — Mar. 25, 1969, Schmitt, Epstein and Polistina, METHOD FOR PREPARATION OF ISOMERICALLY PURE $\beta$-GLYCOLIDE AND POLYMERIZATION METHOD FOR GLYCOLIDE COMPOSITIONS EMPLOYING PARTIAL HYDROLYZATE OF SAID $\beta$-GLYCOLIDE.

U.S. Pat. No. 3,442,871 — May 6, 1969, Schmitt, Epstein and Polistina, PROCESS FOR POLYMERIZING A GLYCOLIDE.

U.S. Pat. No. 3,457,280 — July 22, 1969, Schmitt, Epstein and Polistina, $\alpha$-GLYCOLIDE AND METHODS FOR THE ISOLATION THEREOF.

U.S. Pat. No. 3,468,853 — Sept. 23, 1969, Schmitt and Polistina, PROCESS OF POLYMERIZING A GLYCOLIDE.

U.S. Pat. No. 3,565,077 — Feb. 23, 1971, Glick, DENSIFIED ABSORBABLE POLYGLYCOLIC ACID SUTURE BRAID, AND METHOD FOR PREPARING SAME.

U.S. Pat. No. 3,565,869 — Feb. 23, 1971, DeProspero, EXTRUDABLE AND STRETCHABLE POLYGLYCOLIC ACID AND PROCESS FOR PREPARING SAME.

U.S. Pat. No. 3,597,449, Aug. 3, 1971, DeProspero and Schmitt, STABLE GLYCOLIDE AND LACTIDE COMPOSITIONS.

U.S. Pat. No. 3,597,450, Aug. 3, 1971, Schmitt, Polistina, Epstein and DeProspero, PREPARATION OF GLYCOLIDE POLYMERIZABLE INTO POLYGLYCOLIC ACID OF CONSISTENTLY HIGH MOLECULAR WEIGHT.

U.S. Pat. No. 3,600,223, Aug. 17, 1971, Glick and McCusker, PROCESS FOR CLEANING POLYGLYCOLIC ACID FILAMENTS USEFUL AS ABSORBABLE SURGICAL SUTURES.

U.S. Pat. No. 3,626,948, Dec. 14, 1971, Glick and McPherson, ABSORBABLE POLYGLYCOLIC ACID SUTURE OF ENHANCED IN-VIVO STRENGTH RETENTION.

U.S. Pat. No. 3,728,739, Apr. 24, 1973, Semp, STERILE SURGICAL GLOVES.

U.S. Pat. No. 3,728,839, Apr. 24, 1973, Glick, STORAGE STABLE SURGICALLY ABSORBABLE POLYGLYCOLIC ACID PRODUCTS.

U.S. Ser. No. 118,974, Feb. 25, 1971, Ramsey and Delapp, PREPARATION OF POLYGLYCOLIC ACID IN FINELY DIVIDED FORM, now U.S. Pat. No. 3,781,394, Dec. 25, 1973.

U.S. Ser. No. 171,320, Aug. 12, 1971, Schmitt and Bailey, POLYGLYCOLIC ACID IN SOLUTIONS, now U.S. Pat. No. 3,737,440, June 5, 1973.

U.S. Ser. No. 176,291, Aug. 30, 1971, Glick and Chirgwin, DOPE-DYED POLYGLYCOLIC ACID SUTURES.

U.S. Ser. No. 190,290, Oct. 18, 1971, Schmitt and Epstein, COPOLYMERS ABSORBABLE BY LIVING MAMMALIAN TISSUES, now U.S. Pat. No. 3,736,646, June 5, 1973, METHOD OF ATTACHING SURGICAL NEEDLES TO MULTIFILAMENT POLYGLYCOLIC ACID ABSORBABLE SUTURES U.S. Ser. No. 277,537, Aug. 3, 1972, Glick and Chirgwin, GREEN POLYGLYCOLIC ACID SUTURES AND SURGICAL ELEMENTS.

U.S. Pat. No. 2,552,027, Bird and Rochow, May 8, 1951, CASTING GELATIN TABLETS, in Column 6, line 18 and following shows gelatin formulations for slow and uniform release of therapeutic agents from a carrier matrix.

West German Pat. No. 2,051,580, based on U.S. Ser. No. 868,899 of Oct. 23, 1969, and U.S. Ser. No. 79,309 of Oct. 8, 1970, discloses sustained release drugs using a lactide/glycolide copolymer as a carrier matrix.

Other United States and foreign patents disclose surgical elements in which biodegradability and absorption results from the hydrolytic attack of tissue components on glycolic acid ester linkages in the polymer composing such surgical elements.

FIELD OF INVENTION

This invention relates to absorbable surgical structural elements of polyhydroxyacetic ester hereafter called polyglycolic acid (PGA), particularly gauze and felt dressings. At the time of use, such elements should be sterile.

SUMMARY

Definitions in the textile trades are frequently somewhat ambiguous. For purposes of the present application, certain terms are defined:

A "filament" is a single, long, thin flexible structure of a non-absorbable or absorbable material. It may be continuous or staple.

"Staple" is used to designate a group of shorter filaments which are usually twisted together to form a longer continuous thread.

An absorbable filament is one which is absorbed, that is digested or dissolved, in living mammalian tissue.

A "thread" is a plurality of filaments, either continuous or staple, twisted together.

A "strand" is a plurality of filaments or threads twisted, plaited, braided, or laid parallel to form a unit for further construction into a fabric, or used per se, or a monofilament of such size as to be woven or used independently.

A "fabric" is a three dimensional assembly of filaments, which may be woven, knitted, felted or otherwise formed into a flexible sheet having two layer dimensions and a thinner thickness dimension. A fabric may be cut to a desired size before or at the time of use.

Except where limited specifically or by context, the word fabric includes both absorbable and non-absorbable cloth, or a fabric or cloth that is partially of absorbable polyglycolic acid.

A "dressing" is a woven, knitted, felted or braided fabric, of at least one layer, which is designed to protect a wound and favor its healing. As used herein, the term dressing includes bandages, insofar as they contact the wound itself. The dressing may be entirely internal.

A "bandage" is strip of gauze, or other material used to hold a dressing in place, to apply pressure, to immobilize a part, to obliterate tissue cavities or to check hemorrhage. Except insofar as the bandage comes in contact with a wound, or the exudate from a wound, there is no need for the bandage to be of polyglycolic acid. If the bandage may be in a position where absorbability by living tissue of at least part of the bandage is desirable, at least that part should be of polyglycolic acid.

A "repository" is a composite of a medicament and a carrier whereby the medicament is placed in a desired location, and released slowly by the carrier so that the effective therapeutic action of the medicament is extended. Slowly digestible drug release devices, including pills and pellets, may be inserted subcutaneously, or orally, or into any body cavity where slowed release of the medicament is desired. Digestible carriers are preferred. The digestion may be in the intestinal tract or in tissue depending on the desired administrative site.

The dressing may be in part directive of growth, as, for example, in nerve tissue, which grows slowly, and as a result has regeneration impaired by the more rapid growth of scar tissue which can block the growth of the nerve tissue. With a wrap-around sheath of PGA sheet, or PGA fabric or a split or solid tube used to support, place, hold and protect; regeneration of nerve tissue and function is greatly aided. Other factors may inhibit regeneration of nerve tissue or function, but with the exclusion of scar tissue, such other factors may be separately treated. PGA is particularly useful in splicing nerves because PGA is completely dissolved in tissue and leaves minimal or no residual scar tissue from the PGA.

For different purposes and in different types of tissue the rate of absorption may vary. In general, an absorbable suture or solid load bearing prosthesia should have as high a portion of its original strength as possible for at least 3 days, and sometimes as much as 15 days or more, and preferably should be completely absorbed by muscular tissue within from 45 to 90 days or more depending on the mass of the cross-section. The rate of absorption in other tissues may vary even more.

For dressings, strength is often a minimal requirement. Some dressings, as, for instance, on a skin abrasion, may need strength for only a few hours, until a scab forms, and rapid decrease of strength and absorption is an advantage so that when the scab is ready to fall off, the dressing does not cause a delay. For burns, and larger lesions, strength and reinforcement may be desired for a longer period.

In common with many biological systems, the requirements are not absolute and the rate of absorption as well as the short-term strength requirement varies from patient to patient and at different locations within the body, as well as with the thickness of the section of PGA.

The PGA may be formed as tubes or sheets for surgical repair and may also be spun as thin filaments and woven or felted to form absorbable sponges or absorbable gauze, or used in conjunction with other compressive structures as prosthetic devices within the body of a human or animal where it is desirable that the structure have short-term strength, but be absorbable. The useful embodiments include tubes, including branched tubes or Tees, for artery, vein or intestinal repair, nerve splicing, tendon splicing, sheets for tying up and supporting damaged kidney, liver and other intestinal organs, protecting damaged surface areas such as abrasions, particularly major abrasions, or areas where the skin and underlying tissues are damaged or surgically removed.

In surgical techniques involving internal organs, hemorrhage may be a major problem. Some of the organs have such tissue characteristics that it is very difficult to use sutures or ligatures to prevent bleeding. For example, the human liver may suffer traumatic damage or exhibit tumors or for other reasons require surgery. In the past it has been very difficult to excise part of the liver or to suture the liver without the combined problems of the sutures cutting out and hemorrhage at the surface causing such major complications as to either prevent surgery or cause an unfavorable prognosis.

It is now found that a sponge or pad or velour of polyglycolic acid may be used to protect the surface and permit new feats of surgical intervention. For instance, polyglycolic acid filaments may be formed into a woven gauze or felted sponge or a velour, preferably the construction is fairly tight by textile standards, and such sponge may be placed on the surface of the bleeding organ such as the liver or a lung with either gentle suturing to hold the element or with ties in the nature of ligatures to hold the element in position with a certain amount of body fluids flowing into the sponge and being absorbed, which results in hemostasis and prevention of further loss of body fluids. If a liver or lung is so repaired, the organ may be replaced in the body cavity and the wound closed. Note the technique in Didusch, U.S. Pat. No. 2,143,910. The polyglycolic acid elements usually maintain a substantial portion of their strength for at least 7 to 15 days which permits healing processes to occur and then the polyglycolic acid is absorbed by the body so that in healthy living tissue with good blood supply, the prosthetic device is completely absorbed in 60 to 90 days.

Where surgically useful, the sponge or fabric can be used as a bolster to prevent a suture from cutting out. For instance, if the liver is to be sutured, a PGA dressing can be placed on the surfaces to reinforce the tissue and prevent the suture from cutting into rather than retaining the tissue. Such PGA pads of gauze or felt protect tissue from cutting for at least several hours and are absorbed in less than about 90 days.

Pads, bandages or sponges of polyglycolic acid are extremely useful in surgical techniques in which it is the intent to remove the major portion or all of such sponges, felt or pad but, through inadvertence or accident, part of it may remain. For instance, in a surgical operation one of the problems which arises is the lint from cotton sponges remaining in the wound. If polyglycolic acid sponges are used, any small fragments which are accidentally displaced are absorbed without incident and even if a sponge is left in the wound, the deleterious effects are minimal. It is not desired that large volumes filled with sponges, particularly if the sponges are or become saturated with blood, remain in body cavities. The absorption of the blood clot appears to present more of a problem than the PGA. The location is also critical as some locations are more sensitive to blood clots than others. Small sponges result in minimal side effects.

The use of polyglycolic acid as a sponge or pad is particularly advantageous for surface abrasions. In the past it has been necessary to put on a dressing and avoid having the non-absorbable dressing grow into the tissue at all costs. Because the polyglycolic acid absorbs, if elements of polyglycolic acid gauze are beneath the regenerating tissue level, the tissue will regenerate and absorb polyglycolic acid filaments with the residual polyglycolic acid in the scab falling off when the scab is displaced.

The dressing that contacts tissue should be sterile. A strippable sterile package is a convenient storage system to maintain sterility between the time of manufacture and time of use.

Even in cosmetic surgery or skin surgery, where in the past it has been quite customary to use silk sutures and, after the tissue is regenerated sufficient to be self retaining, remove the sutures so that they do not leave scars, the use of polyglycolic acid sutures now permits implantation of sutures through the skin with the part below the skin surface being absorbed and the part above the skin surface falling off when it is no longer retained by the polyglycolic acid below the skin. The resulting minimal degree of scarring at the skin surface is highly advantageous.

In surgery various tissues need to be retained in position during healing. Defects and wounds of the abdominal wall, chest wall and other such tissues need to be reconstructed. For a hernia, a permanent splice or reinforcement is often desired as shown in Usher, U.S. Pat. Nos. 3,054,406, SURGICAL MESH or 3,124,136, METHOD OR REPAIRING BODY TISSUE. For some surgical procedures, a temporary reinforcing is desired to provide strength while body tissues are healing; and after the body tissues have assumed the load, foreign components are no longer desired. Tissue retention using the general techniques disclosed in the Usher patents, supra, are readily accomplished using either an absorbable PGA monofilament or polyfilament fabric or mesh or by using a non-absorbable material such as polyethylene or polypropylene or polyester woven as a bicomponent mesh or knit with PGA. The use of a bicomponent fabric has the advantage of giving additional early strength for holding the tissues in position during initial regeneration with the PGA portions being absorbed, and permitting body tissues to invade and reinforce the permanent mesh.

In common with other surgical procedures, it is often desirable that a bicomponent structure be used which provides the spacing desired for non-absorbable elements, with the PGA element holding the structure in a desired geometrical configuration at the start of the healing process. As the polyglycolic acid element is absorbed, regeneratig tissue invades and replaces the dissolved PGA so that the non-absorbed element is left in a desired configuration, interlaced with living tissue in a stress-transferring relationship.

The choice of a non-absorbable reinforcement, a partially absorbable reinforcement, or a completely absorbable reinforcement is a matter of surgical judgment, based upon the condition of the patient, the body structure under treatment, and other medical factors. The present PGA fabric, or bicomponent fabrics using PGA for the absorbable portion greatly expand the scope of reinforcement available to a surgeon, and permits using absorbable structures for reinforcement in many new medical techniques.

For instance, a PGA sponge may be used in a cavity after tooth extraction to stanch the flow of blood. The sponge is either absorbed by regenerating tissue, or disintegrates into the mouth, permitting improved recovery after extractions. A sponge, gauze, or suture of PGA is effective. The hydrolysis products of PGA are not conducive to bacterial growth, and, hence, may aid in recovery of the patient.

The PGA may be exposed to moisture during storage before use, or may be of a lower molecular weight, both of which increases the rate of absorption by the body tissues, so that the surgical sponge in an extraction, or the prosthetic implant, has a controllable rate of absorption.

The medical uses of PGA include, but are not necessarily limited to:

A. Pure PGA
1. Solid Products, molded or machined
   a. Orthopedic pins, clamps, screws and plates
   b. Clips (e.g., for vena cava)
   c. Staples
   d. Hooks, buttons and snaps
   e. Bone substitute (e.g., mandible prosthesis)
   f. Needles
   g. Non-permanent intrauterine devices (spermocide)
   h. Temporary draining or testing tubes or capillaries
   i. Surgical instruments
   j. Vascular implants or supports
   k. Vertebral discs
   l. Extracorporeal tubing for kidney and heart-lung machines
2. Fibrillar Products, knitted or woven, including velours
   a. Burn dressings
   b. Hernia patches
   c. Absorbent paper or swabs
   d. Medicated dressings
   e. Facial substitutes
   f. Gauze, fabric, sheet, felt or sponge for liver hemostasis
   g. Gauze bandages
   h. Dental packs
   i. Surgical sutures
3. Miscellaneous
   a. Flake or powder for burns or abrasions
   b. Foam as absorbable prosthesis
   c. Substitute for wire in fixations
   d. Film spray for prosthetic devices B. PGA in Combination with other Products
1. Solid Products, molded or machined
   a. Slowly digestible ion-exchange resin
   b. Slowly digestible drug release device (pill, pellet)
   c. Reinforced bone pins, needles, etc.
2. Fibrillar Products a. Arterial graft or substitutes
b. Bandages for skin surfaces
c. Burn dressings (in combination with other polymeric films.)

The synthetic character and hence predictable formability and consistency in characteristics obtainable from a controlled process are highly desirable.

The most convenient method of sterilizing PGA prostheses is by heat under such conditions that any microorganisms or deleterious materials are rendered inactive. A second common method is to sterilize using a gaseous sterilizing agent such as ethylene oxide. Other methods of sterilizing include radiation by X-rays, gamma rays, neutrons, electrons, etc., or high intensity ultrasonic vibrational energy or combinations of these methods. The present materials have such physical characteristics that they may be sterilized by any of these methods.

Different sterilizing procedures may be required, when PGA is used as a repository for therapeutic agents.

One of the early repositories meeting considerable acceptance was bees wax for penicillin. Penicillin was suspended in the bees wax, the mixture injected into a patient, and the penicillin thus released from the repository over a period of several days or longer. After the penicillin had been released, the bees wax remained in the subject as an undesired foreign body for an extended period of time.

PGA permits similar usage as a solid repository except that after the drug is released, the polymer itself dissolves or is digested or absorbed and leaves nothing as an undesired residue in the tissue.

Controlled release rates are very desirable. Some drugs are injected with the intention that the faster the drug is absorbed, the better. Others need to be emplaced under such conditions that the maximum concentration released is within desired limits, and yet the drug is made available over an extended period of time so that a single implantation can last for whatever length of time is desired for a particular medical procedure. For instance, as a birth control pill, the blood levels of certain steroids are to be maintained at a low level for prolonged periods. The steroid may be dissolved in chloroform, the present polymers added, the mixture dried and tabletted. By using PGA which is subjected to varying moisture exposure, the relative rate of release and absorption can be varied.

For contraceptive purposes, an effective storage bank may be desired with a prolonged release time. The medicament containing absorbable polymer may be shaped and used as an intrauterine contraceptive device, having the advantages of both shape and the released medicament, and additionally an inherently limited effective life. With other steroids used for the treatment of pathological conditions, the choice may be that the entire dosage is released uniformly over a period of from 1 to 30 days, or so. For other drugs the release period desired may be even more widely variable. For some antibiotics an effective concentration for 1 or 2 days is preferred for control of some pathogens.

The absorbable PGA may be ground and mixed with drugs and processed through a tabletting press, or the mixture may be moistened with a binding liquid and compressed. For instance, PGA may be mixed with steroids, and compressed either dry or with a binder, to a desired size and shape.

The PGA drug mixture may be used orally. PGA has a relatively slow hydrolysis rate in the acid environment in the stomach and a higher hydrolysis rate in the more alkaline environment of the intestine. For oral ingestion, any effective release must be achieved before the elimination of the residual PGA, which in humans is normally within 48 hours. The time in other mammals may vary.

For implantation in tissues, either subcutaneously, intramuscularly, or in other areas, a PGA polymer is used which gives the desired release rate and then after its therapeutic effect is achieved, the residual absorbable polymer is absorbed which frees the tissues from foreign bodies.

Whereas the repository as a sheet or pellet may be introduced beneath the skin, a convenient form is to shape the PGA medicament mixture as a thread, which is implantable beneath the skin as readily as a suture, and which can be implanted at a cosmetically convenient location for systemic medicaments, or in a selected area, for medicaments whose application is to be localized.

Additional materials such as silicones may be coated upon the polymer repository where it is desired that the release rate be further delayed. For instance, there are pathological conditions under which the release of a drug or hormone may be desired for the remaining life of a subject. In fact, the remaining life of a subject may be determined by an effective release of a drug from an implanted repository, or other source.

Sterility is essential in the subcutaneous implants, and desirable in oral forms. If the medicament is adaptable to radiation, heat, or ethylene oxide sterilizing cycles, such may be used. For more labile medicaments, the absorbable repository forms are made using sterile techniques from sterile components, or a sterilization procedure is chosen which is compatible with the medicament characteristics.

PGA can be considered as essentially a product of polymerization of glycolic acid, that is hydroxyacetic acid, which in simplified form is shown by the equation:

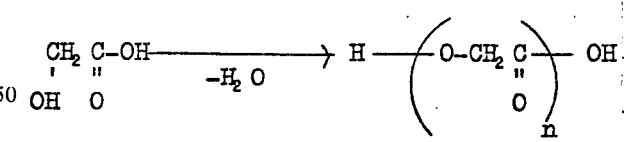

Preferably $n$ is such that the molecular weight is in the range of about 10,000 or more. Above 500,000 the polymer is difficult to mold.

In these molecular weight ranges the polymer has a melt viscosity at 245°C. of between about 400 and about 27,000 poises. Because the PGA is from a synthetic and controllable source, with the controlled molecular weight and controlled small percentage of comonomer, the absorbability, stiffness, and other characteristics can be modified.

Among several methods by which PGA can be prepared, one preferred route involves the polymerization of glycolide,

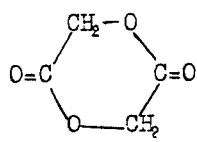

the cyclic dimeric condensation product formed by dehydrating hydroxyacetic acid. During polymerization of glycolide, the ring is broken and straight-chain polymerization occurs.

Small quantities of other materials may be present in the chain, as for example, d,l-lactic acid, its optically active forms, homologs, and analogs. In general, plasticizers tend to interfere with crystallinity, orientation, etc., and weaken the prosthesis but are useful for sponges and films.

Other substances may be present, such as dyes, antibiotics, antiseptics, anaesthetics, and antioxidants. Surfaces can be coated with a silicone, beeswax, and the like to modify handling or absorption rate.

The polymerization of glycolide occurs by heating with or without a catalyst, or may be induced by radiation such as X-rays, gamma rays, electron beams, etc. Polymers may also be obtained by condensing glycolic acid or chloracetic acid with or without a catalyst under a variety of conditions. Good moldable objects or fibers are most readily obtained when the melt viscosity at 245°C. is about 400 to about 27,000 poises.

Polyhydroxyacetic esters have been described in U.S. Pat. No. 2,668,162, Lowe, "Preparation of High Molecular Weight Polyhydroxyacetic Ester," and U.S. Pat. No. 2,676,945, Higgins, "Condensation Polymers of Hydroxyacetic Acid."

U.S. Pat. No. 2,668,162 — Lowe quantifies a small amount of lactides as up to 15%, disclosing, for example, that a preparation of a copolymer of 90/10 glycolide/lactide offers two advantages over the homopolymer of glycolide. One advantage is that the melting point of the copolymer is lower than the homopolymer, being in the neighborhood of 200°C; and the other that the entire reaction can be coducted at approximately the melting point of the copolymer. Operation at the lower temperatures decreases the rate of degradation of the polymer which gives a polymer of lighter color.

Example 4 of said U.S. Pat. No. 2,668,162 shows reaction conditions.

The processes described in the above two patents can be used for producing PGA from which prostheses may be made. Additives such as triphenylphosphite or Santo-Nox, a disulfide aromatic phenol, can be added as color stabilizers.

DRAWINGS

Figure 1:
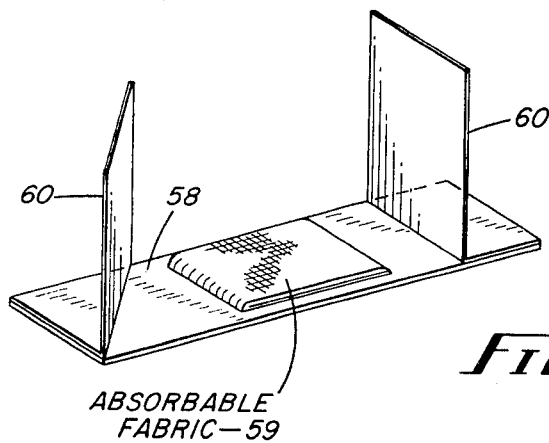
FIG. 1 is an adhesive bandage, having a polyglycolic acid gauze pad to contact a wound.

PGA for the construction of the prostheses shown in the drawings can be produced as set forth in the following examples, in which parts are by weight, unless otherwise clearly indicated:

EXAMPLE 1

100 Parts of recrystallized glycolide (melting point 85.0° to 85.5°C.) are intimately mixed with 0.02 part of methoxyacetic acid, 0.03 part of phenoldisulfide (Santo-Nox), and 0.03 part antimony trifluoride. Separate glass tubes are each charged with approximately 20 grams of the mixture, deoxygenated by repeated evacuation and argon purging, then sealed under vacuum and heated to 185° to 190°C. for 4 ½ hours. On cooling a white opaque tough PGA is produced in a 97.5% yield with a melt viscosity at 245°C. of 5,000 poises. The polymer is reheated and spun into filaments at a temperature of about 230°C. at a speed of about 150 feet per minute. The filaments produced are cooled, then drawn at about 55°C. When drawn to 5 times the original length a strong tough filament is produced. The dry filaments are in condition for use.

EXAMPLE 2

The polymer of the preceding Example is formed into a plurality of smaller filaments, seven of which are twisted into a polyfilamentary strand, which is sterilized and used following the techniques of Example 1.

Because it is a synthetic polymer the methods of forming are more versatile than in starting with naturally occurring materials.

EXAMPLE 3

Into a suitable reaction vessel there is charged 400 parts of a commercial glycolic acid which is then heated from room temperature to about 200°C. over a period of about 4 hours. When the pot temperature has reached 185°C., the pressure of the system is reduced from atmospheric pressure to 15 mm. of Hg, causing the water of condensation and/or esterification to distill off. The residue is allowed to cool and is pulverized into about 280 parts of a powder which is then added in small increments to a suitable pyrolysis chamber maintained at a temperature of about 250°–285°C. at a pressure of less than 15 mm. of Hg. The distillate, about 238 parts by weight, is dissolved in a minimum amount of hot ethyl acetate, and after decolorizing and purifying with active carbon, the distillate is recrystallized from the above solution to provide 160 parts of product having a melting point of about 82.5°–84.0°C. The infrared spectrum confirms that the product is substantially pure glycolide.

The glycolide thus prepared is polymerized in the presence of an alcohol free of non-benzenoid unsaturation and free of any reactive groups other than alcoholic hydroxy groups and in the presence of $SnCl_2.2H_2O$.

A heavy walled glass tube having a bore of about three-tenths inch and sealed at one end is charged with 3 parts of the substantially pure glycolide composition, 0.04 part of a 0.1% ether solution of $SnCl_2.2H_2O$ (about 0.0013% of $SnCl_2.2H_2O$ based on the weight of the substantially pure glycolide composition), 0.0166 part of lauryl alcohol (0.346 mole percent based on the moles of the substantially pure glycolide composition), and a magnetic steel ball 5/32 inch in diameter. The tube is evacuated and purged with argon. The tube is evacuated again to a vacuum of less than 1 mm. of Hg. and the top is sealed. The reaction tube is placed in a vertical position in a closed glass chamber throughout which dimethyl phthalate is refluxed at 222°C. The boiling point of the dimethyl phthalate is controlled by varying the pressure of the system. At periodic intervals after melting, the viscosity of the reaction mixture is measured by raising the steel ball by means of a magnet and measuring the rate of the fall of the ball in sec./in. Ninety minutes after the melt is first achieved, the ball drop time is 550 sec./in. or about 7,200 poises, and after 120 minutes, the ball drop time is 580 sec./in. or about 7,600 poises.

The PGA thus produced is spun into 0.002 inch diameter fibers and used to form strands.

Additional PGA, similarly produced is used to form sheets, or tubes. These are wrapped around nerves, traumatically severed, to protect such nerves from invasive scar tissue growth, while the nerve is regenerating.

Solid PGA has such tremendous strength that a surgical needle can be formed on the end of a PGA suture by either fusing the PGA of the suture, or molding additional PGA onto the suture end, the needle being bent and pointed as may be surgically preferred for a specific surgical procedure.

The ends or edges of mono-component or bi-component fabrics containing PGA may be rendered rigid by molding such edges, with or without additional solid PGA to a desired configuration. It is often easier to insert and retain a flexible fabric prosthetic tube if the end of the tube is of a size and shape to be inserted into the severed end of a vessel.

Other methods and improvements in the production, spinning and treatment of PGA are set forth in the related data following the cross-references, supra.

In FIG. 1 is depicted a strip of adhesive tape 58 on which is placed a gauze pad 59 of PGA. The adhesive tape and gauze pad is guarded by protective strips 60 during shipment and storage. An outer protective envelope may be used. Other than using PGA for the wound contacting pad, the construction is conventional. The pad is preferably sterile, and packaged dry and sterile.

Figure 2:
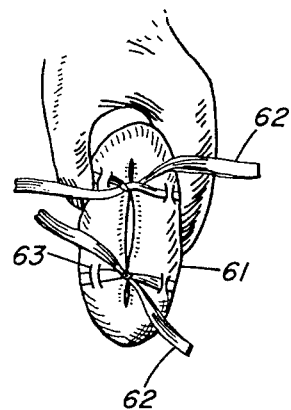
FIG. 2 is a view of a kidney tied together with a polyglycolic acid strip.

In FIG. 2 is shown an operation on a kidney 61 after surgical intervention, the kidney is wrapped by PGA strips 62. These may be tied together or sutured together by the surgeon. Slits 63 in the kidney may be used to aid in retention of the PGA strips during recovery, or the strip may be woven, knitted or felted so as to be retained in position by the configuration of the tie.

Figure 3:
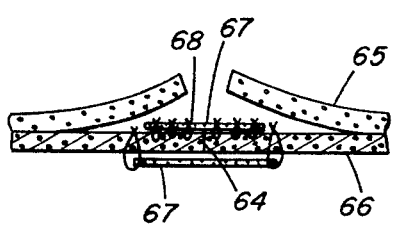
FIG. 3 is a cross-section of a wound with polyglycolic acid fabric reinforcing the tissue layers.

In FIG. 3 is shown a defect in a lining wall, for instance, the peritoneal wall. The tissue 66 of the peritoneal wall is placed between two PGA fabric patches 67, and sutured thereto by loop sutures 68. The outer tissue layer 65 is sutured later. The loop sutures may pierce one or both PGA fabric patches, and the tissue may close the defect 64 completely, or with a gap or overlap, as the surgeon prefers.

Such an absorbable patch retains the tissue in position during healing, and if an adequate regeneration of tissue is expected, may be entirely absorbable. If an inadequate strength of tissue is expected, a bi-component fabric may be used, with non-absorbable reinforcing elements, such as a mesh, remaining to strengthen the tissue.

Figure 4:
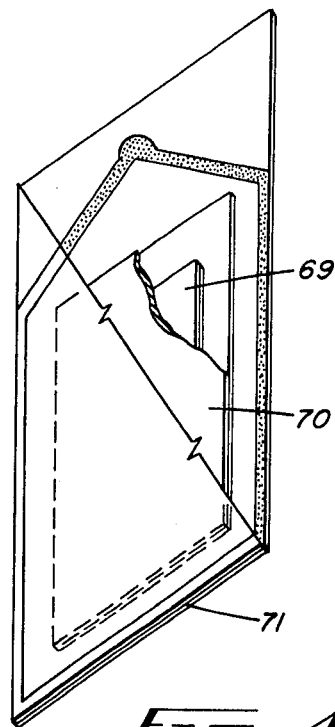
FIG. 4 is a pictorial view of a sterile PGA gauze bandage in an interiorly sterile strippable package.

As shown in FIG. 4, a PGA gauze wound dressing 69, consisting of several layers of PGA gauze, is folded in a paper shield 70, which is sealed in a strippable foil envelope 71, such as disclosed in U.S. Pat. No. 3,728,839, supra. For storage stability, the wound dressing is packaged with very low moisture content, preferably below about 0.05% moisture on the weight of the PGA. For short term stability, a low moisture environment is not critical.

Strippable envelopes for sutures and other surgical elements are disclosed in such patents as Canarius and Kaufman U.S. Pat. No. 2,917,878.

The drawings above are illustrative only of embodiment of the present invention in which various dressings and sponges are placed in or on the human body. From the above drawings and descriptions, it will be obvious to those skilled in the art that many other modifications may be adapted for particular injuries or treatments.

The finding that polyglycolic acid, abbreviated PGA, is absorbable in living tissue, and has marked mechanical strength, as a fiber or solid, including sheet, and hence can be used as an element in, or as, surgical elements, is most unexpected and unpredictable.

Catgut, or regenerated collagen has in the past been used for tissue emplacement, but with collagen, as the collagen is absorbed, a fibrotic tract replaces the collagen, so that in effect scar tissue remains at the site of the emplanted collagen for many years, in many instances for life. Some patients are allergic to collagen. PGA is not a protein, has no amino acids, and has given no evidence of allergic reactions in thousands of implants. With the present PGA elements, the PGA is completely absorbed, and a minimal or no trace of the inserted matter remains after a comparatively short period. This complete absorption, without residual fibrotic tissue, is unique, and an important contribution to surgery.

As it is obvious that examination of such prosthetic devices in humans must wait until autopsy, after death from natural causes, experimental results were conducted on laboratory animals which would permit sacrifice and examination at selected periods. These are shown in the following examples:

EXAMPLE 4

The unique absorbability of polyglycolic acid in surgical procedures permits the construction of devices in which non-absorbable elements are positioned and held in place during the implantation stage by a polyglycolic acid portion of the device but with the polyglycolic acid dissolving and being absorbed. The tissue in regenerating fills the areas formerly occupied by the polyglycolic acid and locks into place and retains the surgical element.

The use of bi-component materials in a bi-component fabric is disclosed in U.S. Pat. No. 3,463,158, supra. Major prosthetic elements can be readily retained in location by using a bi-component element. For example, heart valves which are of a non-dissolving permanent material may be wound with the bi-component material which permits the polyglycolic acid to be absorbed.

EXAMPLE 5

Becoming of increasing interest and importance is the implantation of cosmetic devices. For example, some women, due to partial surgical removal of breast tissue because of malignancies or traumatic injuries, are left with smaller breasts than are considered desirable. Additionally, some women are not as well naturally endowed as may be required by the styling trends or fashion at a particular time. In the past, among the first surgical contributions to increasing the size were the injections of silicones. The silicones enlarge the appearance of the breast, but inherently remain shiftable and hence the silicone is apt to migrate from the desired location to some other less strategic area.

A non-migrating prosthetic implantation has been used which consists of a plastic sponge or a plastic bag partially filled with a liquid having a viscosity adjusted to simulate that of natural tissue. The bag is implanted through a slit under the breast, to raise the mammary tissue away from the underlying chest wall which permits surgical reconstruction which has a very natural appearance and resilience. See U.S. Pat. No. 3,559,214 for surgical details.

A difficulty that is encountered is the possibility of displacement of such an implanted bag from the location of choice from the effects of gravity or pressure.

It is found that if the bag to be used is constructed from a physiologically inert material such as polypropylene or a silicone film, the bag can be formed with a surface roughness in which, through loops, or fusion of filaments of polypropylene or other material there is formed a bag to which the non-absorbable filament are attached. If polyglycolic acid as a bi-component material is stitched, woven, felted or otherwise formed into such appendant structures, the element may be readily implaced and the polyglycolic acid portions are dissolved out with naturally occurring tissue replacing the polyglycolic acid and thus becoming intermeshed with the elements attached to the prosthetic bag which interlocks the bag in location in the body tissues, primarily the chest wall, and hence the implanted prosthetic device is firmly locked into the tissues and protected from accidental displacement.

In one embodiment, the implanted prosthetic device is an implantable bag containing viscous liquid therein, which may be a single cell or a sub-divided cell, with a puncturable area in a selected location so that after implantation, a hypodermic needle may be used to puncture through the skin and intervening tissues, the puncturable area and into the main volume of the prosthetic device which permits hypodermic removal or addition of additional liquid so that with a minimum inconvenience, time and expense, the enhancing volume may be modified with changing fashions or the desires of the user.

A similarly constructed element using the same conjoint bi-component displacing technique is available to fill out other areas in which external tissue contours are to be changed. For example, an individual may have been involved in an automobile accident or the victim of a tumor and with the removal of certain tissues, a disfiguring surface configuration remains. By filling in with a prosthetic element of suitable size and shape, the surface configuration can be reconstructed to the great psychological benefit of the subject.

Similar, but solid, devices may be implanted in the nose, chin or ears to modify, restore or correct the surface configuration of the subject. In some instances, it is found that the psychological benefit to the subject far overshadows any surgical risks, costs or inconveniences resulting from the operative technique.

A bi-component system can be used to aid in retaining implanted devices such as internal pacemakers or hearing aids. See U.S. Pat. No. 3,557,775, supra for details of the surgical aspects.

In the case of extensive superficial abrasions, dressings, frequently gauze, pads or wrappings absorb blood or lymph and present a problem because the gauze dressings stick to the wound or are infiltrated by regenerated tissue. In the past, it has been customary to change dressings frequently to prevent such infiltration. Removing an adherent dressing can be quite painful.

EXAMPLE 6

An extensive surface abrasion from sliding on a concrete surface after falling off a motor cycle was debrided and wrapped with a gauze of PGA threads. The wound shows the tendency to bleed into the PGA gauze but the porosity of the gauze aids in rapidly stopping the flow of blood. By using several layers of PGA gauze and permitting the blood to at least partially harden, a minimum amount of the PGA gauze is required and the main protective dressing is of ordinary cotton gauze wrapped around the injured area. A minimum of changing the dressing is required. The outer cotton gauze is removed for inspection to be sure that infection does not occur, but the PGA gauze is allowed to remain in position in the absence of infection. The PGA gauze partly heals into the tissue, and partly remains above the tissue. Fewer manipulative steps aid in preventing the entrance of new pathogens. After healing, the PGA gauze below the new skin surface absorbs in the body and the non-absorbed PGA and the scab separate readily. If desired, the PGA gauze which is not permeated with blood may be cut off and the remaining scab washed with water. The techniques for removing scabs from tissue are conventional. The scab is protected by cotton gauze wrapped from physical damage until the scab falls off in the course of healing. Regeneration continues unobstructed because there is no non-absorbed gauze such as is normally used for surface bandages.

EXAMPLE 7

In the controlling of epistaxis (nose bleed) at times a packing of cotton swabs have been used. By using felted PGA swabs of the same general texture, the bleeding is readily controlled but without any risks from retained foreign bodies. Part of the packing can be removed once bleeding has been controlled, and the remainder can be left until the blood clots are eliminated by natural processes with the PGA sponge being simultaneously eliminated without complications.

As in common with internal pads of PGA, the PGA itself absorbs without incident. Blood which saturates the pad may present more of a problem in absorption. The usual surgical techniques of removing blood where feasible should be used, but the ability of PGA sponges, felts and pads to absorb blood aids in preventing or controlling internal hemorrhage.

EXAMPLE 8

A second degree burn on the dorsal aspect of the arm measuring about 5 × 5 centimeters was debrided and cleaned in the usual manner with antiseptic soap and isotonic saline. The wound was then covered with two pads of PGA absorbable gauze impregnated with furacin and then wrapped in the usual fashion with a non-absorbable cotton gauze. The lesion was inspected routinely by the surgeon, and healed without incident. The cotton gauze was removed, and the PGA gauze parted at the healing line with no trauma to regenerating tissues.

Other medicaments may be used including tetracycline, chlortetracycline, oxytetracycline, sulfadiazine, lincomycin, sulfasymazine, silver nitrate or other antibiotics or antiseptic agents desired by the treating surgeon. The PGA itself shows bactiostatic action.

Obviously, many variants of the embodiments described may be used. Where convenient, the PGA may be colored for ease of identification. For example, green colored, woven, knitted, felted or sponge PGA may be advantageously used. A felted sheet is particularly useful on a burned or abraded surface, as body fluids partially penetrate the felted material, and on healing, that part of the felt which is in living tissue is absorbed, and the remaining part falls off as skin forms under the felt covered surface. A gauze or powder may be similarly used. Powdered PGA acts as a blood coagulant, and aids in scab formation, yet can be readily removed without pain, as that part which is internal is absorbed, and that part which is external is readily removed as tissue regenerates thereunder.

EXAMPLE 9

PGA is very effective as an entirely absorbable implant to control bleeding or hemorrhage.

In an adult New Zealand rabbit, after anesthesia, using conventional operative techniques, the abdomen was opened to expose the liver, the several lobes of the liver mobilized, and approximately 30% of the mass of the liver sliced off the top of the lobes. A felted PGA fabric, about 2 millimeters thick and large enough to cover the cut surfaces was placed on the cut surfaces, and fastened in position by stay sutures of PGA. The felted PGA fabric was rapidly permeated by blood, and arrested bleeding. After inspection to be sure that all major bleeding was controlled, the liver was replaced, and the incision closed. The recovery of the rabbit was uneventful.

Inspection after sacrifice at 15 days, showed the cut surfaces to have healed, liver function to have been maintained, and no evidence of post operative hemorrhage was seen.

Inspection of animals sacrificed at longer periods showed both the PGA felt and the PGA sutures to be completely absorbed.

Bleeding was at least as well controlled, and with less distress to the animal, than comparable experiments using a denatured gelatin or an oxidized cellulose as a hemostatic agent.

If the bleeding does not appear adequately and promptly controlled, agents such as thrombin may be used in addition to the PGA felt.

A PGA felt of completely tissue compatible components and susceptible to hydrolytic degradation to tissue absorbable components gives effective results in controlling bleeding, and tissue reinforcement, particularly of soft tissues such as encountered in the brain, spinal cord, elsewhere in the central nervous system and glandular tissue. Either felt or a gauze or heavier fabric may be used depending on the degree of reinforcement, size and shape needed and surgical preference of the surgeon.

The PGA surgical dressing is sterile at the time of use. Processing is such that the dressing is free from non-tissue absorbable components such as textile finishes, lubricating oils, and other materials not known to be sterile, tissue compatible and hydrolytically degradable to absorbable components, except where tissue reinforcing elements are to be left to strengthen tissues on a long term basis or the non-absorbable components are out of contact with regenerating tissue.

A strong woven or knitted fabric or strong needled felt can be used for tendon repair. Tendon repair is difficult because of the large stresses that may be placed on the tendon. The tendon can be advantageously treated by sewing together the tendon segments at the site of the damage, and then supporting the repair by wrapping the tendon with a felted or woven PGA wrapping, which is secured to the tendon far from the weakened area.

This permits transfer of stress in part around the damaged area until the tendon has time to at least partially heal and regain strength.

We claim:

1. A surgical dressing comprising a sterile tissue contacting fabric susceptible to hydrolytic degradation to tissue absorbable components consisting essentially of sterile filaments of polyglycolic acid, and at least the tissue contacting portion being free from non-absorbable components.

2. The dressing of claim 1 which has physically imposed upon said filaments a small but physiologically effective quantity of a biologically active medicament.

3. The dressing of claim 2 in which the medicament is selected from the group consisting of furacin, chlorotetracycline, tetracycline, oxytetracycline, sulfadiazine, their therapeutically effective salts, and silver nitrate.

4. The dressing of claim 1 in which the tissue contacting fabric is sterile gauze.

5. The dressing of claim 1 in which the tissue contacting fabric is a sterile felted sponge.

6. A two component surface dressing for the exposed surface of living tissue comprising
   an absorbable layer of a fabric susceptible to hydrolytic degradation to tissue absorbable components consisting essentially of sterile filaments of polyglycolic acid adapted to be placed adjacent to living tissue and at least in part to absorb body fluids from such tissue, and to be invaded by and replaced by living tissue, and be absorbed by living tissue, and
   a sterile external non-tissue-absorbable layer, in implacing and retaining relationship with said absorbable polyglycolic layer, whereby said external layer protects the polyglycolic acid layer from mechanical damage, and maintains said polyglycolic acid layer in a desired location during a healing process.

7. The two component dressing of claim 6 in which the external layer is at least in part a strip of adhesive tape.

8. The two component dressing of claim 6 in which the external layer is at least in part a nonabsorbable fabric next to said absorbable fabric layer.

9. A surgical implant comprising a sterile non-absorbable implant whose physical configuration gives a desired constraint to living tissue, and which implant is of a material which is comparatively inert towards living tissue, and a sterile bicomponent retaining member fixedly attached to said implant and which is in implant retaining relationship, with a polyglycolic acid component of the retaining member in a position to be absorbed by and replaced by living tissue which tissue is then intermeshed with the non-absorbable component of the retaining member, to hold the implant in a desired location.

10. A method of protecting the surface of living tissue during a healing process which comprises covering a wound surface with a sterile dressing of filaments of polyglycolic acid, with part of the dressing being retained in the healing tissue and absorbed by the living tissue, and part of the dressing extending above the regenerating tissue; and after healing is substantially complete, removing the non-absorbed part which extends above the tissue surface.

11. The method of claim 10 in which the polyglycolic filaments are pressed into intimate surface contact with a burned area, with exclusion of air, and the tissue regeneration into the polyglycolic acid dressing is observed to insure proper healing by raising only part of the dressing with minimal disturbance of the regenerating tissue.

* * * * *